United States Patent
Kandukuri

(10) Patent No.: US 12,258,129 B2
(45) Date of Patent: Mar. 25, 2025

(54) FLOOR DRYER IN AN AIRCRAFT LAVATORY

(71) Applicant: B/E Aerospace, Inc., Winston Salem, NC (US)

(72) Inventor: Ravindra Ramulu Kandukuri, Secunderrabad (IN)

(73) Assignee: B/E AEROSPACE, INC., Winston Salem, NC (US)

( * ) Notice: Subject to any disclaimer, the term of this patent is extended or adjusted under 35 U.S.C. 154(b) by 252 days.

(21) Appl. No.: 18/079,552

(22) Filed: Dec. 12, 2022

(65) Prior Publication Data

US 2024/0109660 A1    Apr. 4, 2024

(30) Foreign Application Priority Data

Oct. 3, 2022  (IN) .............................. 202241056769

(51) Int. Cl.
*B64D 11/02* (2006.01)
*E03D 9/00* (2006.01)
*E03D 9/04* (2006.01)

(52) U.S. Cl.
CPC .............. *B64D 11/02* (2013.01); *E03D 9/002* (2013.01); *E03D 9/04* (2013.01)

(58) Field of Classification Search
CPC . B64D 11/02; E03D 9/04; E03D 9/002; F24F 1/005; F24F 1/0057
USPC ........... 4/662, 661, 458, 460, 475, 477, 482, 4/209 R, 210, 213, 219, 900; 454/76
See application file for complete search history.

(56) References Cited

U.S. PATENT DOCUMENTS

| | | | |
|---|---|---|---|
| 10,315,769 B2 | 6/2019 | Ooi et al. | |
| 10,407,887 B2 | 9/2019 | Jenson | |
| 10,582,770 B2 | 3/2020 | Yang et al. | |
| 2015/0013063 A1* | 1/2015 | Boodaghians | B64D 11/02 4/663 |
| 2017/0283062 A1* | 10/2017 | Childress | B64D 11/02 |
| 2020/0164988 A1 | 5/2020 | Alvarez | |

(Continued)

FOREIGN PATENT DOCUMENTS

| | | |
|---|---|---|
| CN | 207506521 | 6/2018 |
| DE | 102018002896 | 10/2019 |
| DE | 102020120179 | 2/2022 |

(Continued)

OTHER PUBLICATIONS

European Patent Office, European Search Report dated Feb. 19, 2024 in Application No. 23200650.2.

*Primary Examiner* — Tuan N Nguyen
(74) *Attorney, Agent, or Firm* — SNELL & WILMER L.L.P.

(57) ABSTRACT

A system to distribute air across a lavatory floor is disclosed herein. The system includes a dryer unit and at least one sensor in an aircraft lavatory coupled to a locking mechanism of the aircraft lavatory responsive to an action comprising an actuation of a slide switch to open the locking mechanism of a door of the aircraft lavatory wherein the dryer unit is electronically coupled to the at least one sensor. In response to a detection by at least one sensor of the actuation of the slide switch to open the locking mechanism of the door of the aircraft lavatory, the dryer unit is configured to receive a command from a processor communicatively coupled to the at least one sensor to cause the dryer unit to be activated.

20 Claims, 6 Drawing Sheets

(56) References Cited

U.S. PATENT DOCUMENTS

2021/0371108 A1 12/2021 Zager-Rode et al.

FOREIGN PATENT DOCUMENTS

GB 2549192 10/2017
JP H11324355 11/1999

* cited by examiner

FLOOR DRYER IN AN AIRCRAFT LAVATORY

CROSS-REFERENCE TO RELATED APPLICATIONS

This application claims priority to, and the benefit of, India Patent Application No. 202241056769 (DAS CODE: 8B8C), filed Oct. 3, 2022, and titled "FLOOR DRYER IN AN AIRCRAFT LAVATORY," which is incorporated by reference herein in its entirety for all purposes.

FIELD

The present disclosure generally relates to lavatories, and more specifically to a floor dryer located in lavatory to reduce floor moisture, and remove droplets and dirt accumulated on the aircraft lavatory floor.

BACKGROUND

The aircraft lavatory is a compact space that includes a sink (wash basin) and a toilet. Water from either the sink or the toilet can splash or spill on the floor of the lavatory during operating of the sink taps for washing and flushing of the toilet. The droplets from the water can fall on the floor causing the floor to become moist and slippery. The moisture on the floor may also trap dirt and grime from shoes by frequented lavatory occupants and carry that dirt to other parts of the aircraft including passenger seating areas.

SUMMARY

In various embodiments, a lavatory floor air distribution system is described. The lavatory floor air distribution system, includes a dryer unit; at least one sensor in an aircraft lavatory coupled to a locking mechanism of the aircraft lavatory responsive to an action comprising an actuation of a slide switch to open the locking mechanism of a door of the aircraft lavatory wherein the dryer unit is electronically coupled to the at least one sensor; and in response to a detection by the at least one sensor of the actuation of the slide switch to open the locking mechanism of the door of the aircraft lavatory, the dryer unit is configured to receive a command from a processor communicatively coupled to at least one sensor to cause the dryer unit to be activated.

In various embodiments, the dryer unit is located below the sink of the aircraft lavatory wherein the dryer unit is positioned to distribute air via vents of the dryer unit to reduce the moisture collected on the floor area of the aircraft lavatory caused by droplets from the sink that result in part from spillage in the floor area of the aircraft lavatory.

In various embodiments, the dryer unit is configured to operate within a pre-set period to reduce the moisture on the floor area.

In various embodiments, the dryer unit is configured to operate in response to the aircraft lavatory being unoccupied.

In various embodiments, the dryer unit is configured in a cavity of a monument that supports the sink and is located close to the surface of the floor area to distribute the air across the floor area.

In various embodiments, the dryer unit is configured to distribute air to remove dirt particles from the floor area near the toilet and the sink in the aircraft lavatory.

In various embodiments, the dryer unit is configured operate in a different mode to distribute air freshener within the aircraft lavatory through airflow of distributed air for reducing moisture on the floor area.

In various embodiments, the dryer unit is configured to receive outside air within the aircraft lavatory and to increase airflow within the aircraft lavatory to reduce odors inside the aircraft lavatory.

In various embodiments, the dryer unit is configured to operate with a power source disposed in the aircraft lavatory.

In various embodiments, the dryer unit is configured with an indicator of operation wherein the indicator of operation is located at least one of inside or outside the aircraft lavatory.

In various embodiments, the dryer unit is configured with a plurality of slats to distribute air in a first channel around the floor area of the sink and in a second channel to distribute air around the floor area of the toilet in the aircraft lavatory.

In various embodiments, the dryer unit is configured with a vent with a rectangle shape to distribute air smoothly across the floor area when embedded in the monument in the aircraft lavatory.

The system includes a dryer unit; at least one sensor in an aircraft lavatory coupled to a locking mechanism of the aircraft lavatory that is responsive to at least an action comprising an actuation of a slide switch to open the locking mechanism of a door of the aircraft lavatory wherein the dryer unit is electronically coupled to the at least one sensor; and in response to a detection by the at least one sensor of the actuation of the slide switch to open the locking mechanism of the door of the aircraft lavatory, the dryer unit is configured to receive a command from a processor communicatively coupled to the at least one sensor to cause the dryer unit to be configured to distribute air directly in a floor area of the aircraft lavatory to reduce moisture collected on a surface of the floor area wherein the moisture is formed by at least droplets from a sink and toilet within the aircraft lavatory.

In various embodiments, the dryer unit located below the sink of the aircraft lavatory wherein the dryer unit is positioned to distribute air via vents of the dryer unit to reduce the moisture collected on the floor area of the aircraft lavatory caused by droplets from the sink that result in part from spillage in the floor area of the aircraft lavatory.

In various embodiments, the dryer unit is configured to operate within a pre-set period to reduce the moisture on the floor area.

In various embodiments, the dryer unit is configured to operate after an occupant has used the aircraft lavatory.

In various embodiments, the dryer unit is configured in a cavity of a monument that supports the sink and is located close to the surface of the floor area to distribute the air across the floor area.

In various embodiments, the dryer unit is configured to distribute air to remove dirt particles from the floor area near the toilet and the sink in the aircraft lavatory.

In various embodiments, the dryer unit is configured operate in a different mode to distribute air freshener within the aircraft lavatory through airflow of distributed air for reducing moisture on the floor area.

In various embodiments, the dryer unit is configured to receive outside air within the aircraft lavatory and to increase airflow within the aircraft lavatory to reduce odors inside the aircraft lavatory.

In various embodiments, the dryer unit is configured to operate with a power source currently configured in the aircraft lavatory.

In various embodiments, the dryer unit is configured with an indicator of operation wherein the indicator of operation is located either inside or outside the aircraft lavatory.

In various embodiments, the dryer unit is configured with a plurality of slats to distribute air in a first channel around the floor area of the sink and in a second channel to distribute air around the floor area of the toilet in the aircraft lavatory.

In various embodiments, the dryer unit is configured with a vent with a rectangle shape to distribute air smoothly across the floor area when embedded in the monument in the aircraft lavatory.

In various embodiments, a method for circulating air in an aircraft lavatory is provided. The method includes locating a dryer unit near the floor area to distribute air across a surface of the floor area around a sink and a toilet of the aircraft lavatory; activating, by a controller of the dryer unit, the dryer unit in response to a signal generated by at least one sensor in the aircraft lavatory wherein the at least one sensor is coupled to a locking mechanism on a door of the aircraft lavatory that is responsive to at least an action comprising an actuation of a slide switch of the locking mechanism of the door to open the door of the aircraft lavatory wherein the dryer unit is electronically coupled to the at least one sensor; and in response to a detection by the at least one sensor of the slide switch to open the door of the aircraft lavatory, actuating, by the controller of the dryer unit wherein the controller of the dryer unit is configured to receive a command from a processor communicatively coupled to the at least one sensor, the dryer unit for distributing air on a floor area of the aircraft lavatory for reducing moisture collected on the surface of the floor area wherein the moisture is formed by at least water droplets from the sink and the toilet of the aircraft lavatory.

In various embodiments, the dryer unit is mounted in a cavity below the sink of the aircraft lavatory wherein the dryer unit is configured to distribute air over collected water droplets from the sink on the surface of the floor area of the aircraft lavatory.

In various embodiments, the method for circulating air in an aircraft lavatory further includes operating, by the controller of the dryer unit, the dryer unit for a pre-set time to reduce moisture collected from water droplets on the surface of the floor area near the sink.

In various embodiments, the method for circulating air in an aircraft lavatory further includes operating, by the controller of the dryer unit, the dryer unit, after an occupant has used the aircraft lavatory.

In various embodiments, the method for circulating air in an aircraft lavatory further includes operating, by the controller of the dryer unit, the dryer unit, for distributing air to remove dirt particles from the floor area near the toilet and the sink in the aircraft lavatory.

In various embodiments, the method for circulating air in an aircraft lavatory further includes operating, by the controller of the dryer unit, the dryer unit, for distributing air to purify the aircraft lavatory through airflow of distributed air for reducing moisture on the floor area.

In various embodiments, the method for circulating air in an aircraft lavatory further includes operating, by the controller of the dryer unit, the dryer unit to receive outside air within the aircraft lavatory for increasing airflow within the aircraft lavatory for reducing odors inside the aircraft lavatory.

In various embodiments, the method for circulating air in an aircraft lavatory further includes operating, by the controller of the dryer unit, the dryer unit to operate with a power source currently configured in the aircraft lavatory.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
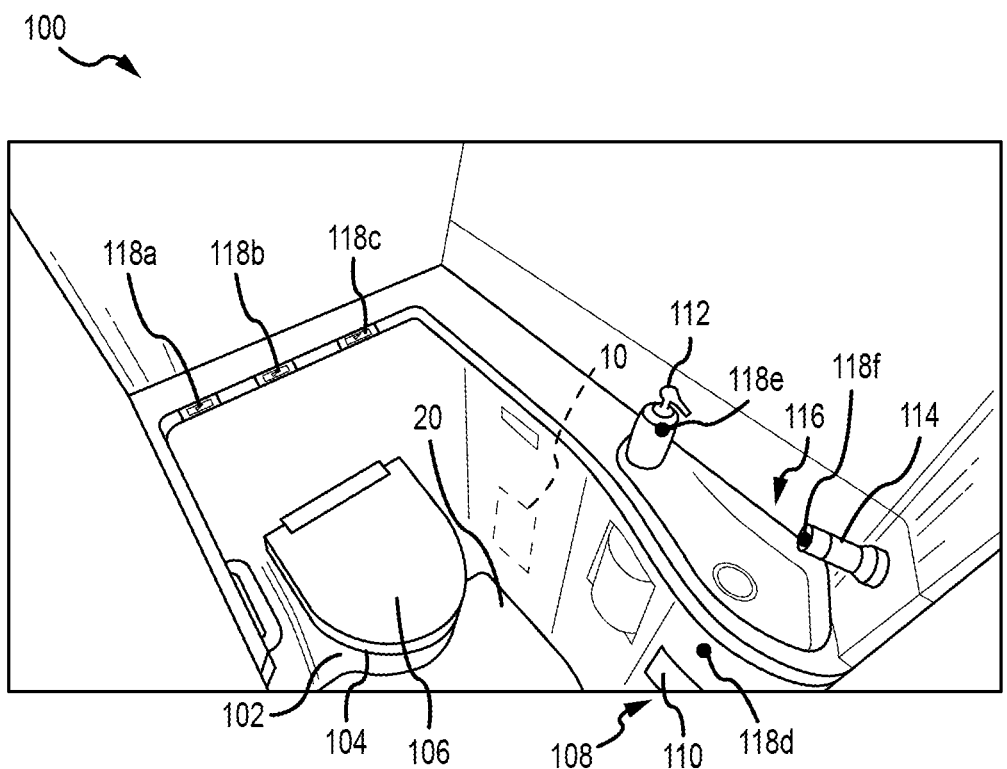
FIG. 1 illustrates diagram of a perspective views of a lavatory in an aircraft, in accordance with various embodiments.

Referring to FIG. 1, in accordance with various embodiments, an exemplary lavatory 100 is illustrated. The lavatory 100 may be implemented in a variety of locations including an aircraft, a train, and an office building. The lavatory 100 includes components such as a toilet 102 having a cover 104 and a seat 106, a trash can 108 with a flap 110, a soap dispenser 112, a faucet 114, and a sink 116. The cover 104 moves up and down to use the toilet 102 in a seated position. The cover 104 and seat 106 moves up and down to use the toilet 102 in a standing position. The flap 110 moves in and out to allow for disposal of garbage into trash can 108.

In various embodiments, a dryer 10 can be placed at a lower part of the lavatory 100 at a variety of locations close to the floor 20 to direct or channel airflow to the floor 20 to remove or cause airflow to distribute away moisture, water droplets and/or dirt that collects on the floor 20 surface. In various embodiments, the dryer 10 can be mounted unobtrusively under the sink 116 or near the toilet 102 and can be configured to be actuated manually by a manual switch located outside the lavatory 100 or inside the lavatory 100 or can be actuated by a command generated by a (central) processor from a set of sensors 118a-118f; if the lavatory 100 is configured with a plurality of sensors for touchless operations. In various embodiments, the dryer 10 may be actuated by sensor detection including a sensor associated with a locking mechanism having a slide switch configured on the lavatory door. For example, after a locking and opening process, signals can be sent to the processor that an occupant is exiting the lavatory 100 (occupied by the occupant) and in response the processor is programmed to send a command to actuate the dryer 10 immediately or after a delay of a certain period or before a detection of a next occupant entering the lavatory 100.

In various embodiments, in an exemplary lavatory 100 configured for touchless operations with motors, or actuators, within the lavatory 100 to operate the toilet 102, cover 104, seat 106, flap 110, soap dispenser 112, and faucet 114, actuations of certain motors for the toilet 102 and the faucet 114 may also be tied with actuation of operation of the dryer 10 immediately or with a time delay.

In various embodiments, also for a touchless configuration of the lavatory 100, several sensors 118a-118f may be provided. In various embodiments, each sensor 118a-118f is associated with a component and the associated motor within the lavatory 100. For example, sensor 118a may be associated the toilet 102, and with flushing the toilet 102; sensor 118b may be associated with the cover 104; sensor 118c may be associated with the seat 106; sensor 118d may be associated with the flap 110; sensor 118e may be associated with the soap dispenser 112; and sensor 118f may be associated with the faucet 114. Each sensor 118a-118f may include an ambient light sensor and a proximity sensor. The ambient light sensor detects light reaching the sensor 118a-118f. The proximity sensor detects how close an object is to the sensor 118a-118f and/or movement near the sensor 118a-118f. For example, sensor 118a sends a value(s) to a processor in response to detecting movement, such as via sensor 118a's proximity sensor, and the processor commands the motor associated with toilet 102 to activate, flushing the toilet 102. Similarly, sensor 118b sends a value(s) to a processor in response to detecting movement, such as via sensor 118b's proximity sensor, and the processer commands the motor associated with cover 104 to raise or lower cover 104. Likewise, sensor 118c sends a value(s) to a processor in response to detecting movement, such as via sensor 118c's proximity sensor, and the processor commands the motor associated with seat 106 to activate to raise or lower seat 106. Similarly, sensor 118d sends a value(s) to a processor in response to detecting movement, such as via sensor 118d's proximity sensor, and the processor commands the motor associated with flap 110 to open or close flap 110. Likewise, sensor 118e sends a value(s) to a processor in response to detecting movement, such as via sensor 118e's proximity sensor of the soap dispenser 112, and the processor commands the motor associated with the soap dispenser 112 to activate and dispense soap. Similarly, sensor 118f sends a value(s) to a processor in response to detecting movement, such as via its proximity sensor, and the processor commands the motor associated with faucet 114 to turn on faucet 114, allowing water to flow into sink 116.

In various embodiments, one or more sensors 118a-118f can also be configured to enable a command operation by the processor to activate the dryer 10 in the lavatory 100. For example, the proximity sensor 118a associated with flushing of the toilet may also provide a value to the processor to send a command or signal to the dryer 10 to dry the floor 20 to prevent splashed water from the toilet wetting the floor 20. In various embodiments, the proximity sensor 118f associated with sending the value to the processor to command operating of the faucet 114 may also enable the processor to send a command to operate the dryer 10 (immediately or after a time delay) to dry the floor 20 in anticipation of water droplets splashed from the sink 116.

Figure 2:
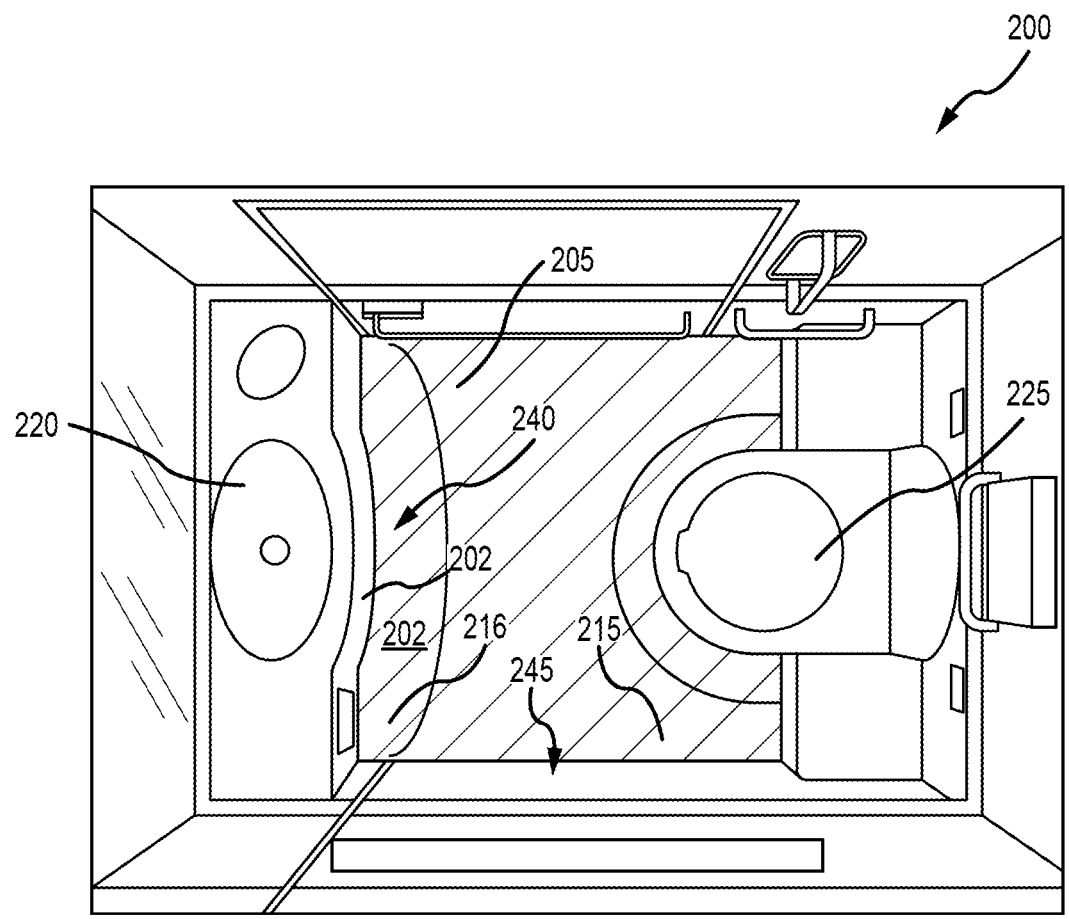
FIG. 2 illustrates a diagram of a top-down view of the aircraft lavatory and airflow from the dryer across the floor of the aircraft lavatory in accordance with various embodiments.

Referring now to FIG. 2, FIG. 2 illustrates a diagram of a top-down view of the aircraft lavatory and airflow from the dryer 202 across the floor of the aircraft lavatory in accordance with various embodiments. In FIG. 2, the lavatory 200 is illustrated with a floor area 205 with a sink 220 on one side, and a toilet 225 on the opposite side. The wet/damp areas 210 and 215 are depicted in the floor area 205 are often wet or damp because of their proximity to the sink 220 and the toilet 225 and areas that can be moisten or wetted from water droplets from either vessel. A dryer 202 configured in a front panel 240 of the monument of the sink 220 or a side panel 245 of the lavatory 200 and positioned low to the floor area 205 or configured with vents directed to the floor area 205 can channel or circulate air across the floor area 205 to capture any surface droplets, any dirt and apply airflow to wet/damp areas 210, 215 to evaporate surface water, surface water droplets, to dry the surface and remove the moisture.

In various embodiments, the position of dryer can be configured to direct the airflow at different velocities and in different streams to cause wetter areas or areas more succumb to water spillage from the toilet 225 or the sink 220 to receive more or greater amounts of airflow for a drying operation. In various embodiments, the dryer 202 can be configured with a vent direction (i.e., a cover plate to vent and direct expunged air) to direct airflow to remove dirt in the floor area 205 that is more trekked by occupants when using the lavatory 200.

In various embodiments, the dryer 202 can operate when the lavatory 200 is not occupied. The dryer may also be operated remotely by remote actuation or be programmed to automatically operated at certain flight phases or periods for less intrusive operations.

In various embodiments, the dryer 202 can be a heating source to heat the floor area 205 and to remove the wet/damp regions on the floor area 205.

In various embodiments, the dryer 202 can elevate the temperature of the lavatory 200 for comfort for babies or temperature sensitive individuals or activities including breast feeding. The temperature of the lavatory 200 often is cooler than the cabin, the dryer can operate to raise the temperature of the lavatory 200 for comfort of the passengers. Further, premium class passengers in long haul flight are often given lighter sleeping apparel such as pajamas and tops, the dryer 202 can be operated by the crew to raise the temperature of a lavatory 200 when accessed by the premium class passengers for more comfort especially during sleep hours when the premium class passengers are likely dressed in lighter night apparel furnished by the carrier. Also, in first class for certain carriers, the lavatory 200 can include a shower, and the dryer 202 can raise the temperature of the interior of the lavatory 200 when the passenger is using the shower by manual actuation or by sensed shower activities via sensors configured in a touchless or like lavatory 200.

Figure 3A:
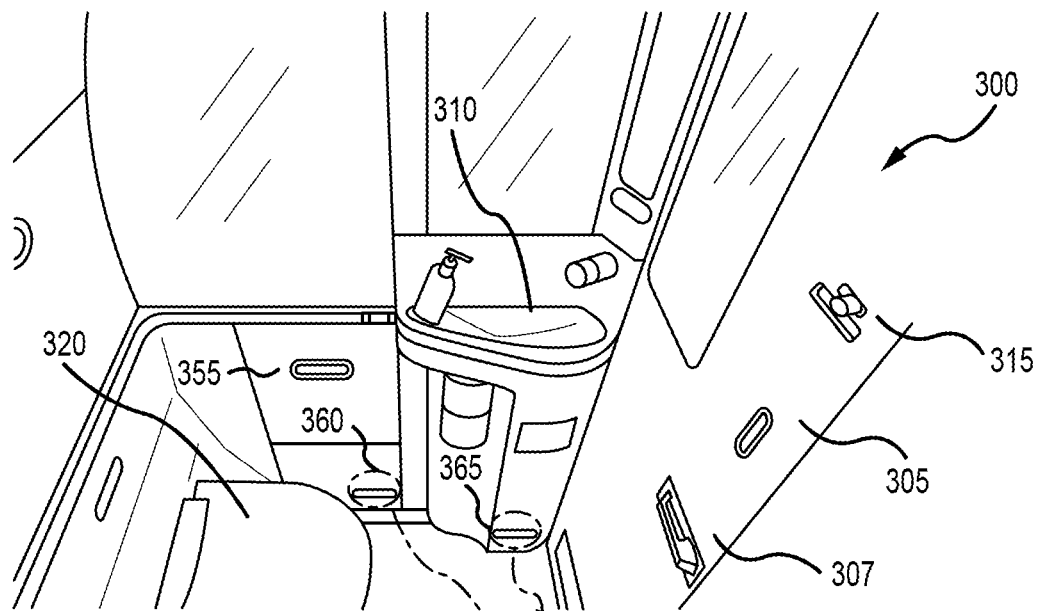
FIGS. 3A and 3B illustrate a lavatory modular enclosure, a dryer, and a location for placement of the dryer in the sink monument in accordance with various embodiments.
Figure 3B:
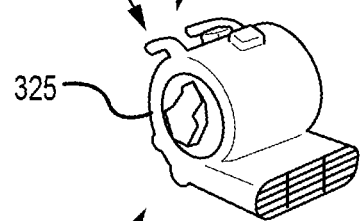

FIGS. 3A and 3B illustrate a lavatory modular enclosure, a dryer, and a location for placement of the dryer in the sink monument in accordance with various embodiments. In FIG. 3A, a lavatory 300 is depicted with a door 305 with a door latch 307 and a separate locking mechanism 315 configured with a slide switch. The dryer 325 is a modular unit that includes a power source and an outlet to vent air across the floor of the lavatory 300. In various embodiments, the door 305 is configured to open towards the sink so that in response to an occupant entering, the occupant's shoes will track dirt or other particles across the middle area of the lavatory 300 in front of the toilet 320. The sink 310 is configured on top of monument with a cavity area 365. There is also a pull-out 355 that can have supplies or be used for waste disposal with a cavity area 360. The cavity areas 365 and 360, each can provide space to insert the dryer 325.

In FIG. 3B, there is depicted another location 370 for positioning the dryer 325 to distribute air in a floor area in front of the toilet 320.

In various embodiments, the dryer 325 can be actuated when the slide switch of the locking mechanism 315 is changed from a closed position to an open position. In embodiments, the dryer 325 can be configured to be communicatively coupled with a sensor that indicates when the slide switch is moved to unlock the door 305. In various embodiments, a time delay can be inserted to cause the dryer 325 to wait a few moments for the occupant to leave the lavatory 300 before actuation to operate unobtrusively without the occupant's knowledge.

In various embodiments, the dryer 325 can be actuated by the door latch 307 operation with the slide switch operation of the locking mechanism 315.

In various embodiments, the dryer 325 once configured inside the monument of the sink 310 or the pull-out 355 would cause only a vent to be visible to an occupant in the lavatory 300. For example, an occupant seated on the toilet 320 when looking down would only view the vent (cover) of the dryer 325.

In various embodiments, the dryer 325 can have filtration features that include an air filter to filter air channel from the dryer 325 and to trap particles in the interior of the lavatory 300 air. For example, depending on the materials that make up the filter and its construction method, particles with a diameter of a few micrometers or larger can be removed from the circulating air by the dryer 325 in the lavatory 300.

In various embodiments, the dryer 325 may be configured with filtration devices that incorporate additional apparatus (such as electrostatic precipitators) to introduce charges to the particles channeled in airflow by the dryer 325 to enhance the trapping efficiency and HEPA filters for particle trapping. Also, other air purification systems can be incorporated in the dryer 325 airflow such as use of ultraviolet (UV) light apparatuses positioned within the cavity and proximate to the intake or outtake of the dryer 325 outlet or inlets of air received or expunged into the lavatory 300 to destroy trapped microbes and prevent spreading of viruses from occupant to occupant who uses the lavatory 300. Also, the dryer 325 can prevent contact surface-based virus exposure with the circulated air across the floor as well as surface parts of the sink 310 and the toilet 320 exposed to the exterior and are subject to touch by the occupant when using the lavatory 300 for virus removal or reduction by the air distribution and capturing of the viruses in the air streams.

In various embodiments, the dryer 325 can be deployed with air purifier to prevent mold and exposure to occupants who suffer from mold or other allergies. In various embodiments, the dryer 325 can help to ventilate the lavatory 300 to reduce odor. In various embodiments, a HEPA filter may be attached to the inlet or outlet of the dryer 325 to filter particles channeled and distributed in the lavatory 300, across the floor and the other contact surfaces in the interior of the lavatory 300.

In various embodiments, the dryer 325 can be configured with scented and unscented filter cartridges for odor elimination and can be automated or manually actuated to keep the lavatory 300 smelling fresh. For example, after an occupant using the toilet 320, and the occupant is aware there is line of passengers to use the lavatory 300 or enters the lavatory 300 after waiting in a line formed outside the lavatory door 305, the occupant can either manually activate the dryer 325 at an exterior switch before immediate entry to the lavatory 300 or may have access to a button near the toilet 320 to activate the dryer 325, or may activate the dryer 325 using a mobile device to initiate an odor reduction operation or an air purification process for comfort and prevention of virus exposures.

In various embodiments, the dryer 325 may be configured to warm an occupant's feet, legs, and hands (e.g., when as an example, the occupant is seated on the toilet 320).

Figure 3B:
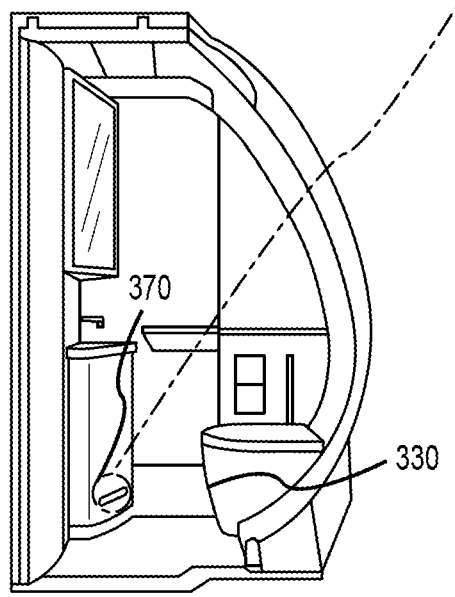

While the disclosure refers to the lavatory 100, 200, 300 as depicted in the depicted arrangement of FIGS. 1-3, the disclosure nevertheless contemplates different arrangements and configurations of the dryer and/or sensors and actuation switches of the lavatory 100, 200, 300.

Figure 4:
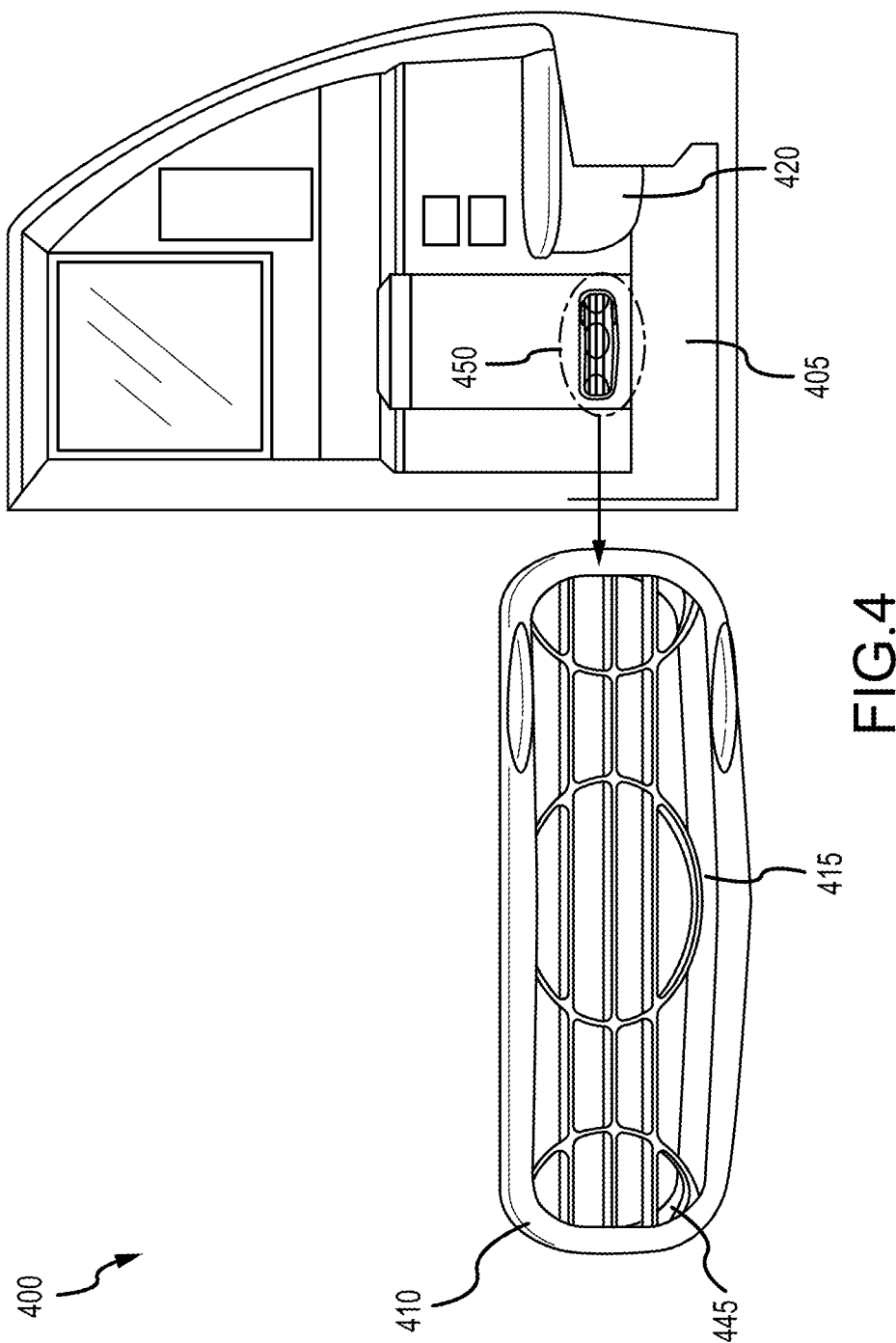
FIG. 4 illustrates a diagram of a vent positioned near a toilet to clean and dry the floor area in front of the toilet of the aircraft lavatory in accordance with various embodiments.

Referring to FIG. 4, FIG. 4 illustrates a diagram of a vent positioned near a toilet to clean and dry the floor area in front of the toilet of the aircraft lavatory in accordance with various embodiments. In FIG. 4 there is shown a lavatory 400 with a vent 410 configured with a dryer 450 flush within a panel (or other monument) and located low to the floor 405 of the lavatory 400 (i.e., within a range of about 1-6 inches (about 2.54-15.24 centimeters) above the floor 405. The vent 410 has a face 415 configured with directional sets of slats 445 to channel the airflow in a desired direction towards or above areas of the floor 405. For example, the airflow can be channeled in a downward direction or a horizontal direction (parallel to the floor 405) to exert both a drying effect to evaporate water droplets on floor 405 surfaces and to clean the floor 405 surfaces by removal of surface dirt from the blowing force of the airflow on the floor 405 surface.

In various embodiments, the face 415 is broad, configured in a rectangular shape with a narrower width and longer breadth. In various embodiments, the face 415 can be configured in a plethora of shapes as desired, for example as an elliptical shape, a circular shape, and a square shape, or even as an irregular shape. Also, the ducting to a fan or blower in the dryer 450 may be configured with changes in a smooth toroidal interior shape that causes less noise and less static deposits of air in the airflow to the exterior for smoother airflow exiting the vent 410 during the dryer 450 operation.

In various embodiments, the vent 410 of the dryer can be configured with multiple sets of slats 445 to direct the airflow in a plurality of directions to dry the floor 405, to circulate in the interior of the lavatory 400, to stream over contact surfaces of the toilet 420, sink and other exposed surfaces in the lavatory 400. In various embodiments, the set of slats 445 of the vent can be configured to direct the airflow down and side to side to cover a wide breath of an area of the floor 405 surface. The drier or dried floor 405 will not only prevent occupants using the lavatory 400 from slippage but will also (particularly if the floor 405 is carpeted) keep the floor 405 cleaner by moving dirt particles from trekked areas of the floor 405 or being trapped by moisture of the floor 405. In various embodiments, the dryer 450 is hidden behind the vent 410 and not visible to the occupant.

Figure 5:
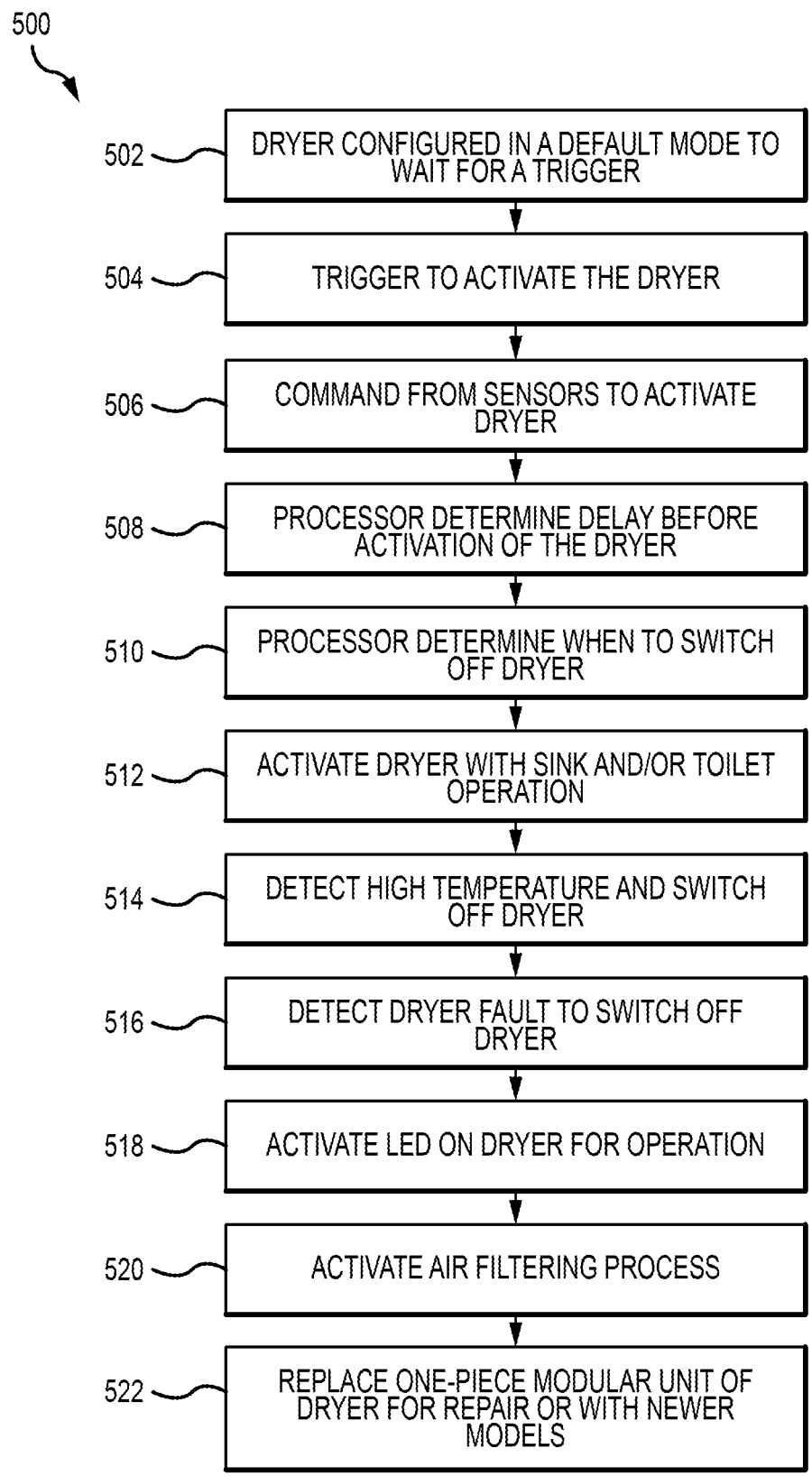
FIG. 5 illustrates a flow chart for the triggers for modes of operation of the dryer in accordance with various embodiments.

FIG. 5 illustrates a flow chart for the triggers for modes of operation of the dryer in accordance with various embodiments. In FIG. 5, at step 502, the dryer is configured to be in a default or initial mode to wait for a trigger to actuate the dryer. At step 504, a trigger to activate the dryer is identified by one or more sensors configured in the lavatory including proximity sensors of an occupant leaving the lavatory (in the case of a touchless configured lavatory), manual sliding of the slide switch door lock to an open position, or a manual switch activation. At step 506, a command from a processor (central processor) used to monitor the sensors or configured with other lavatory functions instructs the dryer to turn. At step 508, the processor may determine a delay period before the actuation of the dryer (e.g., for an occupant to leave the lavatory). In various embodiments, the processor may actuate the dryer periodically in the flight or may actuate the dryer during a takeoff or landing of the aircraft when passengers may not use the lavatory or when the fasten seatbelt sign has been activated. In various embodiments, the dryer operation can be configured to only operate when the lavatory in unoccupied. In various embodiments, the fan of the dryer can be configured for periodic operations of 5-minute increments. The dryer may also be responsive to manual over-ride control from the crew, as well as remote activation by the crew. The dryer can also be configured with maximum allowed operation times on a flight (e.g., for a 2-hour maximum operational time).

In various embodiments, at step 510, the processor can determine the period for activation and for switching off of the dryer. In various embodiments, the processor can switch the dryer to operate in multiple modes of operation including a low, medium, and high mode dependent of sensed data, and external data (i.e., for example in a wetter region of travel that causes a likelihood of more moisture trapped on the lavatory floor surface) or when the lavatory is used a lot and operation is only available for short intermittent sessions. In various embodiments, if sensed data indicates a line of user, high usage of the lavatory or a lesser number of lavatories for use, the dryer fan operation can be changed for optimum usage and to fit the requirements for a particular flight and flight phase.

At step 512, the dryer can be activated simultaneously with operations of the toilet and sink. At step 514, if a temperature sensor in the lavatory indicates a high temperature (i.e., cigarette fire condition), the dryer can be commanded with an override command from the processor to not be activated to prevent fanning of a potential fire.

At step 514, if a fault or error is detected by the processor the dryer can be automatically configured not to operate. Also, the dryer can be configured to be manually switched off by an interior lavatory switch or an external lavatory switch.

At step 516, in various embodiments, an indicator such as an LED light configured with the dryer can give the occupant of the lavatory that the dryer is in a standby mode or is operating. In various embodiments, a graphical user interface can be configured at a remote location that can provide analytical data of the dryer operation in a flight and flight phase of other desired time metric, for monitoring of the dryer use, operability, and when maintenance may be required.

At step 518, in various embodiments, the dryer may be configured manually or automatically to enable other related application such as air filter of the area of the lavatory, for odor control, and testing after a flight cycle form maintenance.

At step 520, the dryer is configured as a one-piece modular unit easily swappable and can be changed with new or more efficient models. In various embodiments, the dryer unit is configured to independently generate usage and other analytical data, to communicate with other dryers on the aircraft and to anticipate future usage in a flight based on usage information received by the processor.

Figure 6:
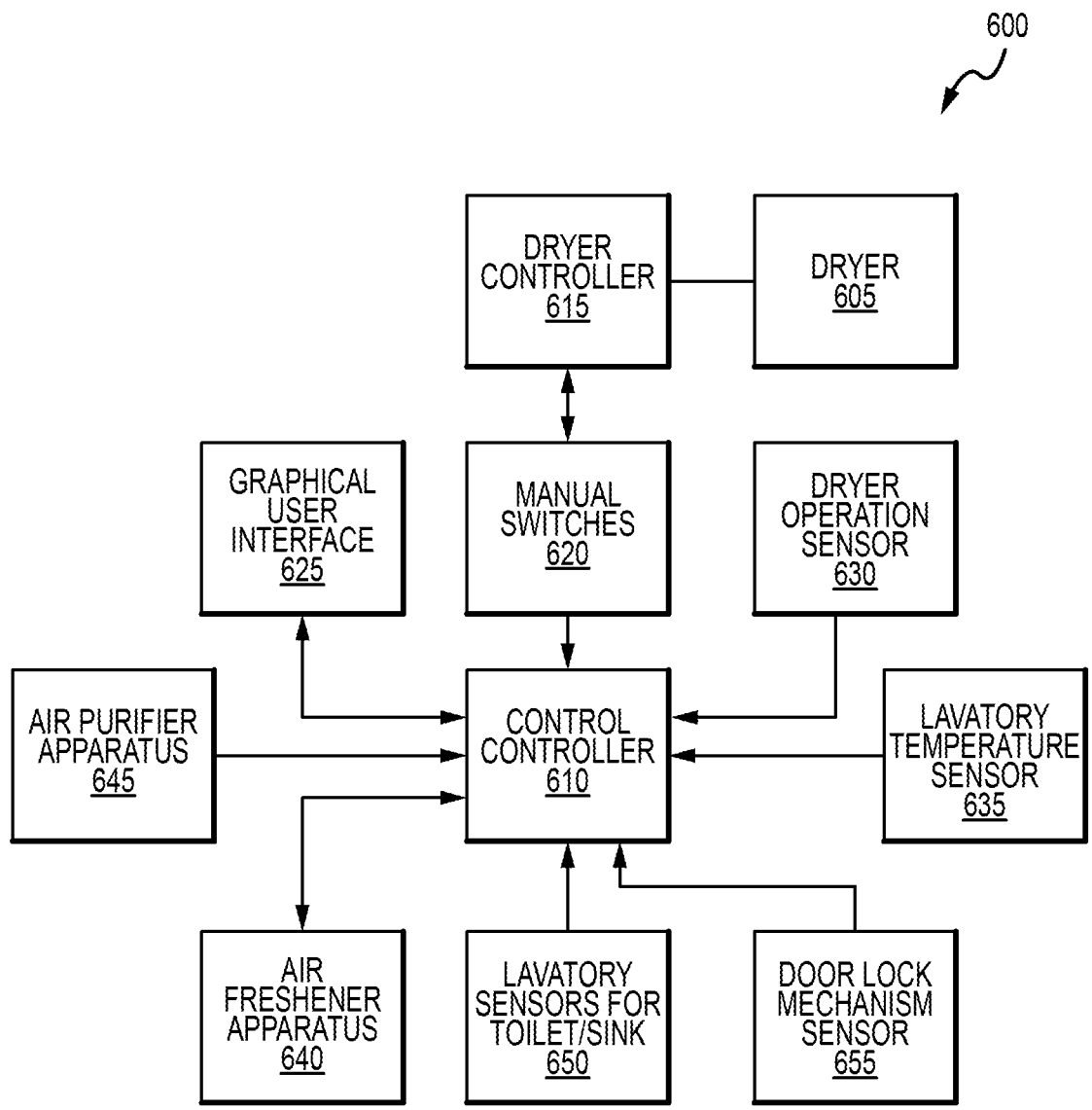
FIG. 6 illustrates a diagram of a system architecture for monitoring the dryer with/without sensors of a lavatory in accordance with various embodiments.

Referring now to FIG. 6, FIG. 6 illustrates a diagram of a system architecture 600 for monitoring the dryer with/ without sensors of a lavatory according to various embodiments of the present disclosure. System architecture 600 can include a central controller 610, a dryer controller 615 configured with the dryer 605, manual switches 620 for dryer operation, dryer operation sensor and indicator 630, at least a lavatory sink and toilet operation sensors 650, lavatory temperature sensor 635, air purifier apparatus add-ons 645 with the dryer, air freshener/odor reduction add-ons 640 with the dryer, door lock sensor 655, and a graphical user interface 625.

In various embodiments, the dryer 605 can be configured with 1/16 HP motor to sufficient distribute air across the lavatory floor. In various embodiments, the dryer controller 615 can enable at least 3-speed controls for the fan velocity of the dryer 605. In various embodiments, the dryer 605 has a weight of approximately 8 lbs. (approximately 3.629 kilograms) and operates at a quiet noise level of about 50 dbs. or less, though noise levels above 50 dbs. are contemplated herein.

In various embodiments, additional sensors can be added such as one or more sensors that sense wetness on the floor that can operate with or without the lavatory sink and toilet operation sensors 650 to communicate with the central controller 610 for sending commands to actuate the dryer 605.

In various embodiments, central controller 610 and dryer controller 615 may comprise one or more processors configured to implement various logical operations in response to execution of instructions, for example, instructions stored on a non-transitory, tangible, computer-readable medium. The one or more processors can be a general-purpose processor, a microprocessor, a microcontroller, a digital signal processor (DSP), an application specific integrated circuit (ASIC), a field programmable gate array (FPGA) or other programmable logic device, discrete gate or transistor logic, discrete hardware components, or any combination thereof.

Central controller 610 and dryer controller 615 may include memory to store executable instructions and data to implement control logic of central controller 610 and dryer controller 605. The memory of central controller 610 and dryer controller 605 may comprise a tangible, non-transitory storage medium and may store data used, for example, for lookup tables and sensor distance information.

Data may include proximity data of occupant use of the lavatory, lavatory temperature data (and light-on/off data), and dryer operation data. Instructions may include commands to activate or deactivate the dryer 605 by the central controller 610 and the dryer controller 605 which are configured to implement method 500 disclosed herein. The dryer 605 operation data can be displayed using the graphical user interface 625 that provides real-time analytics of the dryer operation and is communicatively coupled to the central controller 610 and the dryer controller 605 and the other sensors and apparatuses in operation with the dryer system.

In various embodiments, the dryer 605 is configured to use the current power supply configured in the aircraft lavatory. The lavatory floor air distribution system, wherein the dryer unit is configured to distribute air to remove dirt particles from the floor area near the toilet and the sink in the aircraft lavatory. In various embodiments, the dryer controller 615 is configured to operate the dryer 605 in multiple modes to distribute air freshener within the aircraft lavatory through the airflow of distributed air for reducing moisture on the floor area. The dryer 605 is configured to receive outside air within the aircraft lavatory and to increase airflow within the aircraft lavatory to reduce odors inside the aircraft lavatory. The dryer 605 is configured with an indicator to provide notice of operation and the indicator can be located outside or inside the aircraft lavatory.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A lavatory floor air distribution system, comprising:
   a dryer unit;
   at least one sensor in an aircraft lavatory coupled to a locking mechanism of the aircraft lavatory responsive to an action comprising an actuation of a slide switch to open the locking mechanism of a door of the aircraft lavatory wherein the dryer unit is electronically coupled to the at least one sensor; and
   in response to a detection by the at least one sensor of the actuation of the slide switch to open the locking mechanism of the door of the aircraft lavatory, the dryer unit is configured to receive a command from a processor communicatively coupled to the at least one sensor to cause the dryer unit to be activated.

2. The lavatory floor air distribution system of claim 1, wherein the dryer unit is located below the sink of the aircraft lavatory wherein the dryer unit is positioned to distribute air via vents of the dryer unit to reduce the moisture collected on the floor area of the aircraft lavatory caused by droplets from the sink that result in part from spillage in the floor area of the aircraft lavatory.

3. The lavatory floor air distribution system of claim 2, wherein the dryer unit is configured to operate within a pre-set period to reduce the moisture on the floor area.

4. The lavatory floor air distribution system of claim 3, wherein the dryer unit is configured to operate in response to the aircraft lavatory being unoccupied.

5. The lavatory floor air distribution system of claim 4, wherein the dryer unit is configured in a cavity of a monument that supports the sink and is located close to the surface of the floor area to distribute the air across the floor area.

6. The lavatory floor air distribution system of claim 5, wherein the dryer unit is configured to distribute air to remove dirt particles from the floor area near the toilet and the sink in the aircraft lavatory.

7. The lavatory floor air distribution system of claim 6, wherein the dryer unit is configured to operate in a different mode to distribute air freshener within the aircraft lavatory through airflow of distributed air for reducing moisture on the floor area.

8. The lavatory floor air distribution system of claim 7, wherein the dryer unit is configured to receive outside air within the aircraft lavatory and to increase airflow within the aircraft lavatory to reduce odors inside the aircraft lavatory.

9. The lavatory floor air distribution system of claim 8, wherein the dryer unit is configured to operate with a power source disposed in the aircraft lavatory.

10. The lavatory floor air distribution system of claim 9, wherein the dryer unit is configured with an indicator of operation wherein the indicator of operation is located at least one of inside or outside the aircraft lavatory.

11. The lavatory floor air distribution system of claim 10, wherein the dryer unit is configured with a plurality of slats to distribute air in a first channel around the floor area of the sink and in a second channel to distribute air around the floor area of the toilet in the aircraft lavatory.

12. The lavatory floor air distribution system of claim 11, wherein the dryer unit is configured with a vent with a rectangle shape to distribute air smoothly across the floor area when embedded in the monument in the aircraft lavatory.

13. A method for circulating air in an aircraft lavatory, comprising:
   locating a dryer unit near the floor area to distribute air across a surface of the floor area around a sink and a toilet of the aircraft lavatory;
   activating, by a controller of the dryer unit, the dryer unit in response to a signal generated by at least one sensor in the aircraft lavatory wherein the at least one sensor is coupled to a locking mechanism on a door of the aircraft lavatory that is responsive to at least an action comprising an actuation of a slide switch of the locking mechanism of the door to open the door of the aircraft lavatory wherein the dryer unit is electronically coupled to the at least one sensor; and
   in response to a detection by the at least one sensor of the slide switch to open the door of the aircraft lavatory, actuating, by the controller of the dryer unit wherein the controller of the dryer unit is configured to receive a command from a processor communicatively coupled to the at least one sensor, the dryer unit for distributing air on a floor area of the aircraft lavatory for reducing moisture collected on the surface of the floor area wherein the moisture is formed by at least water droplets from the sink and the toilet of the aircraft lavatory.

14. The method for circulating air in an aircraft lavatory of claim 13, wherein the dryer unit is mounted in a cavity below the sink of the aircraft lavatory wherein the dryer unit is configured to distribute air over collected water droplets from the sink on the surface of the floor area of the aircraft lavatory.

15. The method for circulating air in an aircraft lavatory of claim 14, further comprising:
   operating, by the controller of the dryer unit, the dryer unit for a pre-set time to reduce moisture collected from water droplets on the surface of the floor area near the sink.

16. The method for circulating air in an aircraft lavatory of claim 15, further comprising:
   operating, by the controller of the dryer unit, the dryer unit, after an occupant has used the aircraft lavatory.

17. The method for circulating air in an aircraft lavatory of claim 16, further comprising:
   operating, by the controller of the dryer unit, the dryer unit, for distributing air to remove dirt particles from the floor area near the toilet and the sink in the aircraft lavatory.

18. The method for circulating air in an aircraft lavatory of claim 17, further comprising:
   operating, by the controller of the dryer unit, the dryer unit, for distributing air to purify the aircraft lavatory through airflow of distributed air for reducing moisture on the floor area.

19. The method for circulating air in an aircraft lavatory of claim 18, further comprising:
   operating, by the controller of the dryer unit, the dryer unit to receive outside air within the aircraft lavatory for increasing airflow within the aircraft lavatory for reducing odors inside the aircraft lavatory.

20. The method for circulating air in an aircraft lavatory of claim 18, further comprising:
   operating, by the controller of the dryer unit, the dryer unit to operate with a power source currently configured in the aircraft lavatory.

\* \* \* \* \*